G. W. CORSEPIUS.
SLED RUNNER ATTACHMENT FOR AUTOMOBILES.
APPLICATION FILED OCT. 26, 1917. RENEWED JAN. 2, 1920.
1,350,069.
Patented Aug. 17, 1920.
2 SHEETS—SHEET 2.
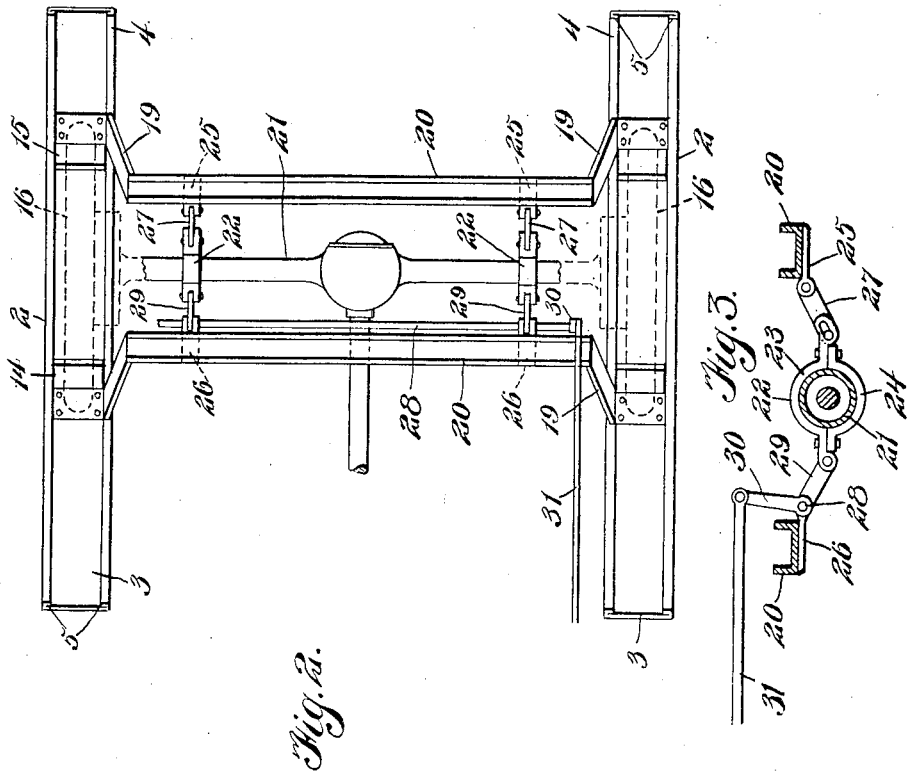
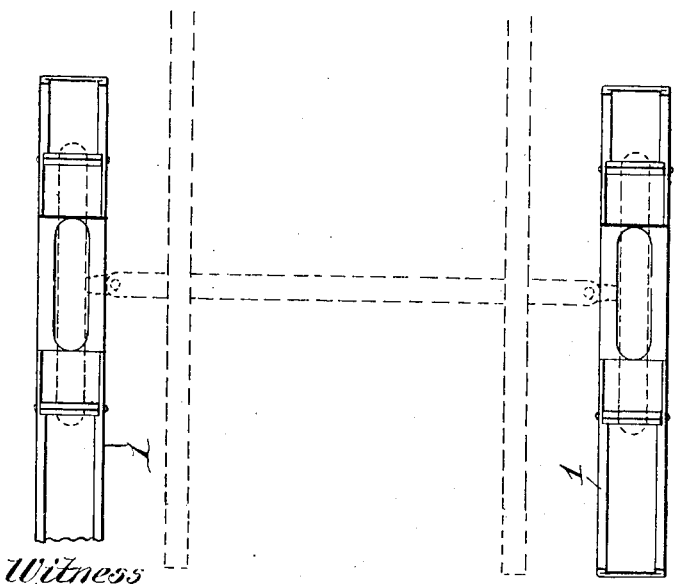
Inventor
G. W. Corsepius
Witness
L. R. Heinrichs
By C. C. Hines,
Atty

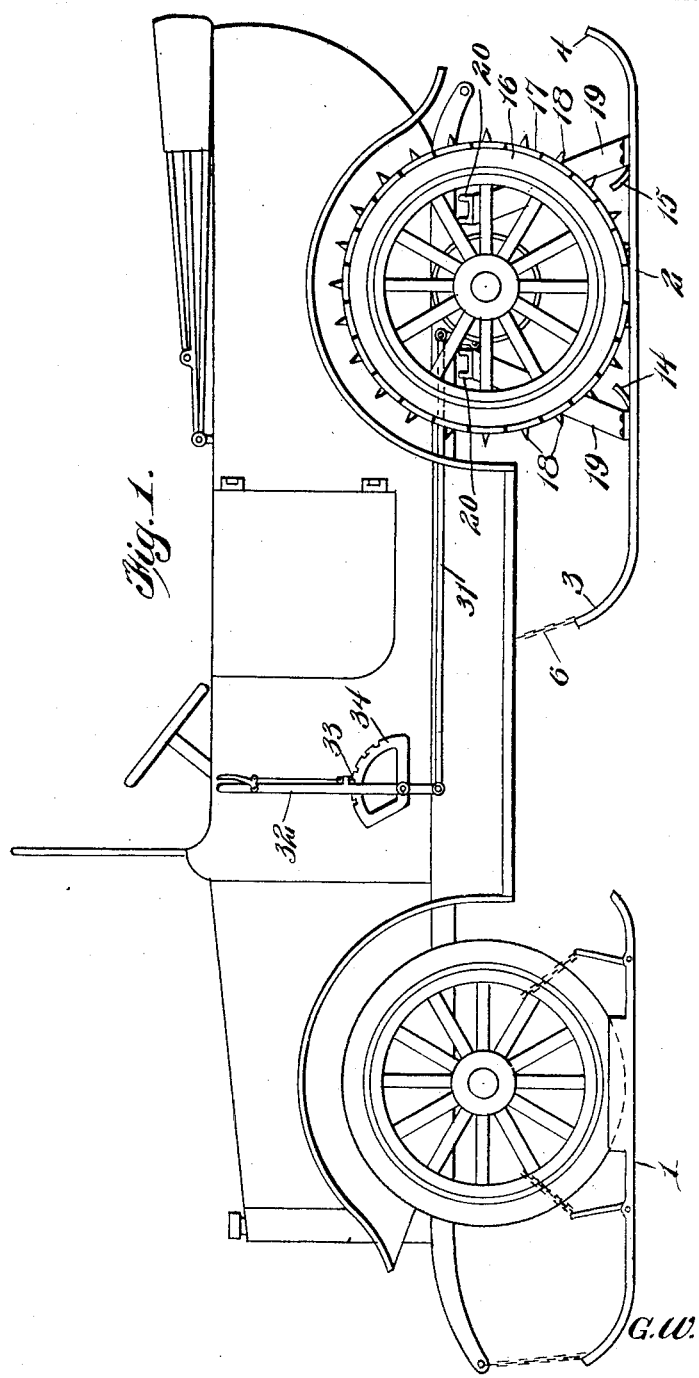

UNITED STATES PATENT OFFICE.

GEORGE W. CORSEPIUS, OF DOWNEY, IDAHO.

SLED-RUNNER ATTACHMENT FOR AUTOMOBILES.

1,350,069.  Specification of Letters Patent.  Patented Aug. 17, 1920.

Application filed October 26, 1917, Serial No. 198,625. Renewed January 2, 1920. Serial No. 349,085.

*To all whom it may concern:*

Be it known that I, GEORGE W. CORSEPIUS, a citizen of the United States, residing at Downey, in the county of Bannock and State of Idaho, have invented new and useful Improvements in Sled-Runner Attachments for Automobiles, of which the following is a specification.

This invention relates to sled runner attachments for automobiles, the invention contemplating the provision of runners which may be applied to the rear axle of an automobile and used in conjunction with front runners applied to the front wheels of the automobile for converting the same into a motor sled.

One object of the invention is to provide means for mounting the rear runners upon the rear axle and for raising and lowering the rear axle and wheels so that the traction grip of the rear wheels upon the snow or ice may be varied as desired, and so that the rear wheels may be raised to a position clear of the ground in order that the car may be allowed to coast down a hill or grade whenever desired.

Another object of the invention is to provide sled runners which are light in weight, while strong and durable in construction, and which may be manufactured and sold at a comparatively low cost.

With these and other objects in view, the invention consists of the features of construction, combination and arrangement of parts, hereinafter fully described and claimed, reference being had to the accompanying drawing, in which:—

Figure 1 is a side elevation showing the application of the invention to an automobile.

Fig. 2 is a plan view of the runners and parts of the chassis and running gear of the car.

Fig. 3 is a view showing the construction of the rear axle bearings and adjusting means.

In carrying my invention into practice I provide, for use in conjunction with suitable front runners 1, a pair of rear runners 2, each preferably made of sheet steel or other sheet metal, and each preferably having upturned front and rear ends 3 and 4, respectively, to adapt them to slide easily over the surface of the ground, the rim edges 5 of each runner being preferably beaded or otherwise strengthened to give stanchness and rigidity to the structure.

The forward ends of the runners 2 are provided with chains or other suitable fastenings 6 for attachment to the front and rear springs or other parts of the running gear or body of the automobile.

Each of the runners 2 is also provided with a central opening 13 at the front and rear face of which are upturned portions or guards 14 and 15, similar to the guards 9 and 10, except that they are rigid with the body of the runner. The openings 13 are designed to receive the lower portions of the rear drive wheels 16 of the automobile, to permit the wheels to come into contact with the ground for a driving action. For the purpose of securing a proper driving action, each rear wheel is equipped with a traction attachment comprising a link chain 17 suitably fastened thereon, said chain being provided at intervals with projecting spurs or lugs 18 to impinge against the ice or snow for a driving action. The guards 14 and 15 of the rear runners protect the chain and tires of the rear wheels from injury by flying particles of ice or snow, rocks and the like, thus increasing the efficiency of the attachment and reducing liability of injury to the rear wheels and axles of the automobile.

Carried by each runner 2 are front and rear standards or uprights 19, riveted or otherwise fastened at their lower ends to the runners and extending upwardly and inwardly at an angle thereto, said uprights being riveted or otherwise fastened at their upper ends to channeled bars 20 arranged in spaced relation and forming a supporting bolster. This bolster is designed to support the rear wheels and rear axle 21 of the vehicle at any desired elevation, and to this end is provided with spaced sets of devices to engage and support the axle and whereby the axle may be vertically adjusted. Each of these sets of devices consists of a clip or clamp 22 arranged to embrace the axle, each clip or clamp consisting of upper and lower sections 23 and 24 bolted or otherwise suitably secured together, thus providing for the ready application and removal of the axle. Attached to the spaced bolster bars 20 in alinement with each clip or clamp 22 are brackets 25 and 26. The rear brackets 25 are coupled to the clips 22 by links 27, while the front brackets 26 are formed with bearings for a transversely extending rod or shaft 28 having link arms 29 projecting therefrom and pivotally coupled to the clips 22 at points diametrically opposite the links 27, the construction being such that when the arms 29 are raised and lowered the clips 22 will be correspondingly raised and lowered, the links 27 being pivotally mounted to accommodate such adjustments. The rod or shaft 28 is also provided with an upturned arm 30 pivotally coupled by a connecting rod 31 with an operating or adjusting lever 32 mounted upon the body or frame of the vehicle, whereby the driver or an occupant of the vehicle may raise and lower the rear axle as desired or required. The lever is provided with a locking dog 33 to engage a rack 34 for securing the lever in a variety of adjusted positions. It will thus be understood that the rear wheels may be raised to cause the driving spurs 18 to project through the openings 13 to a greater or less extent, to secure a greater or less amount of purchase on the surface of the ice or snow, to regulate the driving action and the speed, or that the rear wheels may be raised sufficiently above the bottom surface of the rear runners to throw said wheels out of driving action, thus adapting the vehicle to be coasted down hills or grades, or whenever a positive driving action is unnecessary.

The runners may be constructed at a comparatively low cost and provide a means whereby an automobile may be readily and conveniently converted into a motor sleigh at will, and whereby a motor sleigh of high power and speed may be produced. Also it will be seen that the invention provides a means for securely fastening the runners in position, and in such a manner as to adapt said runners to be applied and removed with facility. By the provision of means for raising the driving wheels clear of the surface of the snow or ice, the vehicle may be allowed to coast whenever a down grade is encountered, with a saving of fuel and greater enjoyment to the occupant or occupants of the vehicle.

Having thus fully described my invention, I claim:

1. A traction attachment for automobiles comprising a pair of sled runners, a bolster carried by said runners and composed of spaced bolster sections, clips engaging the axle housing, links connecting the clips with the bolster sections for adjustably supporting the rear axle from the bolster, means associated with the link mechanism for raising and lowering the axle, and suitable traction devices applied to the wheels of the rear axle.

2. A traction attachment for automobiles comprising a pair of sled runners having openings therein, a bolster carried by said runners and composed of spaced bars, clips for engagement with the ends of the axle housing, a set of links connecting the clips with one of the bolster bars, a second set of links connecting the clips with the other bolster bar, means associated with one set of links for transmitting motion to the clips for raising and lowering the axle, and traction devices for application to the wheels of the axle for operation through the openings in the sled runners.

3. A traction attachment for automobiles comprising a pair of sled runners having openings therein, uprights rising from said runners, a bolster carried by the runners and comprising front and rear bars connected with said uprights, clips for engagement with the opposite ends of the axle housing, a set of links connecting the clips with the rear bolster bar, a rock shaft journaled upon the front bolster bar, links connecting said shaft with the clips, means for rocking said shaft to raise and lower the clips and the rear axle, and suitable traction devices for application to the rear wheels for operation through the openings in the runners.

In testimony whereof I affix my signature.

GEORGE W. CORSEPIUS.